United States Patent
Crosby

(10) Patent No.: US 7,113,336 B2
(45) Date of Patent: Sep. 26, 2006

(54) MICROLENS INCLUDING WIRE-GRID POLARIZER AND METHODS OF MANUFACTURE

(76) Inventor: Ian Crosby, 10 Stainmore Dr., Great Lumley, Chester-le-Street, County Durham, DH3 4SH (GB)

( * ) Notice: Subject to any disclaimer, the term of this patent is extended or adjusted under 35 U.S.C. 154(b) by 0 days.

(21) Appl. No.: 10/747,536

(22) Filed: Dec. 29, 2003

(65) Prior Publication Data

US 2004/0201890 A1    Oct. 14, 2004

Related U.S. Application Data

(60) Provisional application No. 60/437,253, filed on Dec. 30, 2002.

(51) Int. Cl.
*G02B 5/30* (2006.01)
(52) U.S. Cl. ............... 359/486; 359/494; 359/570
(58) Field of Classification Search ............... 359/486
See application file for complete search history.

(56) References Cited

U.S. PATENT DOCUMENTS

| | | | |
|---|---|---|---|
| 4,289,381 A * | 9/1981 | Garvin et al. ......... 427/163.1 |
| 5,267,077 A * | 11/1993 | Blonder ................ 359/280 |
| 5,425,046 A | 6/1995 | Davis, Jr. ............. 372/106 |
| 5,630,902 A * | 5/1997 | Galarneau et al. ..... 156/379.8 |
| 5,772,905 A | 6/1998 | Chou ................. 316/44 |
| 6,108,131 A * | 8/2000 | Hansen et al. ......... 359/486 |
| 6,235,141 B1 * | 5/2001 | Feldman et al. ........ 156/250 |
| 6,348,995 B1 * | 2/2002 | Hansen et al. ......... 359/486 |
| 6,391,528 B1 | 5/2002 | Moshrefzadeh et al. ... 430/321 |
| 2002/0159150 A1 | 10/2002 | King et al. ........... 359/485 |
| 2002/0167727 A1 | 11/2002 | Hansen et al. ......... 359/486 |
| 2002/0191880 A1 | 12/2002 | Borrelli et al. ........ 385/11 |
| 2003/0107815 A1 * | 6/2003 | Redmond ............... 359/619 |
| 2003/0112510 A1 | 6/2003 | Florence .............. 359/486 |
| 2003/0223670 A1 | 12/2003 | Nikolov et al. ........ 385/11 |
| 2004/0032663 A1 * | 2/2004 | TeKolste .............. 359/618 |
| 2004/0125246 A1 * | 7/2004 | Okamori et al. ........ 349/5 |

FOREIGN PATENT DOCUMENTS

| | | | |
|---|---|---|---|
| JP | 59-012404 A | * | 1/1984 |
| JP | 60-097304 A | * | 5/1985 |
| JP | 06-027419 A | * | 2/1994 |
| JP | 2000-284117 A | * | 10/2000 |
| SU | 1781659 A1 | * | 12/1992 |
| WO | WO88/07215 | | 9/1988 |

OTHER PUBLICATIONS

Sharaishi et al; "Vertical Integration Technology for Fiber-Optic Circuit"; Optoelectronics; vol. 10, No. 1; Mar. 1995; pp. 55-74.
Krauss, et al.; "Nano-compact disks with 400 Gbit/in$^2$ storage density fabricated using nanoimprint lithography and read with proximal probe"; Appl. Phys. Lett. 71 (21); Nov. 1997; pp. 3174-3176.

* cited by examiner

*Primary Examiner*—Arnel C. Lavarias
*Assistant Examiner*—Derek Chapel
(74) *Attorney, Agent, or Firm*—Timothy M. Schaeberle

(57) ABSTRACT

Microlenses including wire-grid polarizers and methods for their manufacture are disclosed. The method involves forming wire-grid polarizer patterns on a surface of the microlens. The devices and methods provide simple and economical microlenses with polarizers.

10 Claims, 5 Drawing Sheets

MICROLENS INCLUDING WIRE-GRID POLARIZER AND METHODS OF MANUFACTURE

This application claims the benefit of priority of U.S. Provisional Application Ser. No. 60/437,253 filed on Dec. 30, 2002.

FIELD OF THE INVENTION

This invention relates to microlenses that include wire-grid polarizers and methods of their manufacture.

BACKGROUND OF THE INVENTION

Microlenses are widely used in telecommunications systems and optical devices such as switches, circulators, isolators, and wavelength division multiplexers. Microlenses are frequently used to focus and/or collimate light emitted from a light source, for example, a laser, or other optical components into an optical fiber. In many applications, it may be necessary to maintain polarization of light in an optical device or system, and it may be necessary to insert a polarizer in the path of the light to control polarization. The addition of a separate polarizer element can add at least two or more optical surfaces to a system. Additional optical surfaces have undesirable associated transmission loss resulting from an increase in reflection.

There is a trend toward miniaturization of optical devices. Accordingly, it would be desirable to provide a microlens having a polarizer element that does not add two or more optical surfaces. A microlens and polarizer with fewer optical surfaces would also potentially reduce the complexity of devices and manufacturing time and cost. It would be desirable to provide a microlens and polarizer that does not require welding, soldering, or adhesives to permanently affix the separate components in place.

SUMMARY

Certain embodiments of the invention relate to optical devices comprising a microlens including at least one surface through which light propagates and a wire grid polarizer formed on the at least one surface through which light propagates. Other embodiments relate to methods for forming optical devices including a microlens and a wire grid polarizer formed on a surface of the microlens. It is to be understood that both the foregoing general description and the following detailed description are exemplary and are intended to provide further explanation of the invention as claimed.

DETAILED DESCRIPTION

Before describing several exemplary embodiments of the invention, it is to be understood that the invention is not limited to the details of construction or process steps set forth in the following description. The invention is capable of other embodiments and of being practiced or carried out in various ways.

In overview, certain embodiments of the invention relate to microlenses including polarizers. In preferred embodiments, the microlenses include wire grid polarizers. Other embodiments of the invention relate to methods of forming wire grid polarizers on the surface of a microlens. Microlenses with polarizers can be used to form a variety of optical devices including, but not limited to, fiber optic collimators that include a fiber and a lens. The lenses can be used in a wide variety of devices, including DWDM's, OADM's, isolators, circulators, hybrid optical devices, optical attenuators, MEMs devices, and optical switches.

Figure 1:
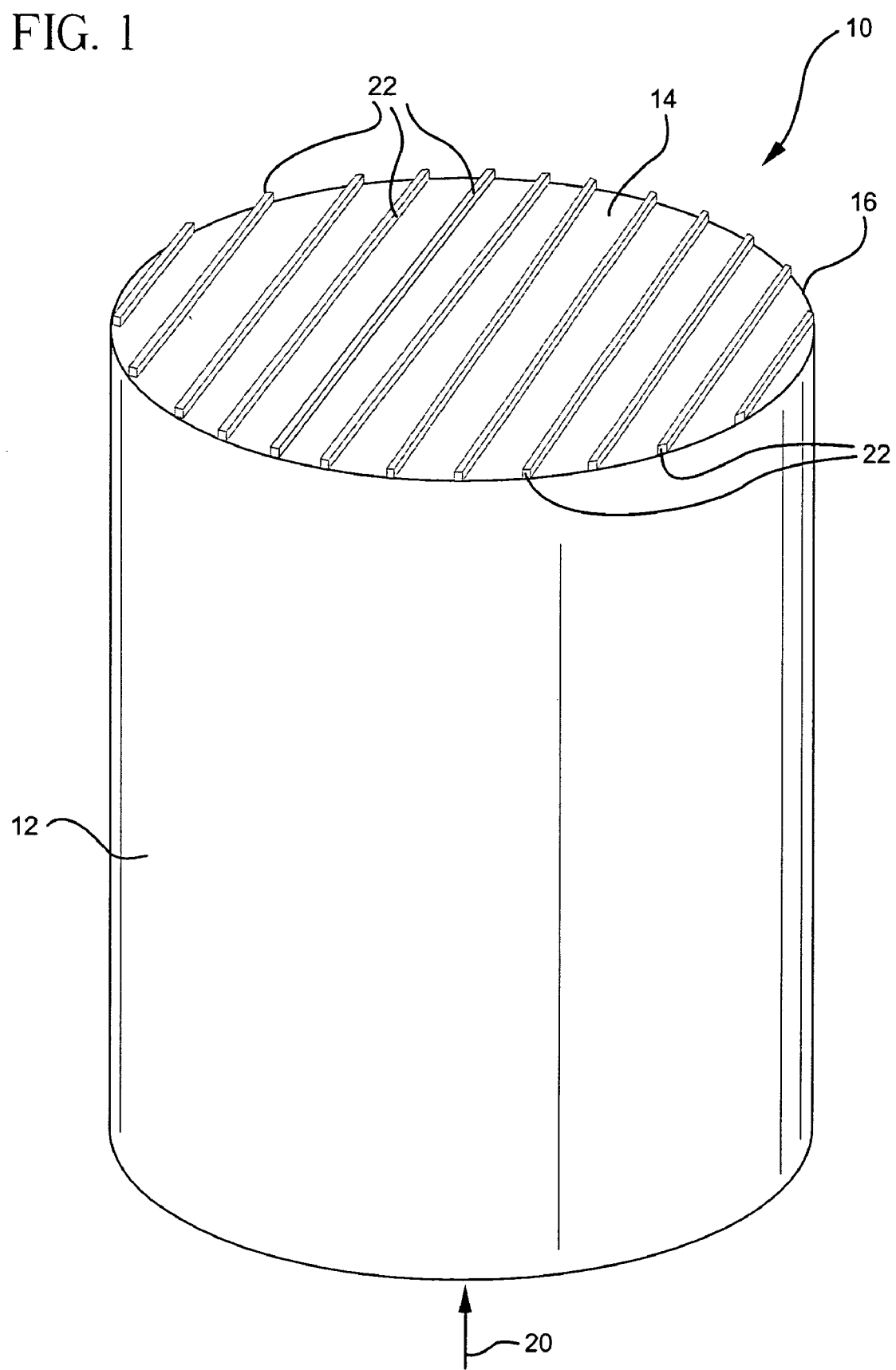
FIG. 1 is a perspective view of a lens including wire grid polarizer according to one embodiment of the invention.
Figure 2:
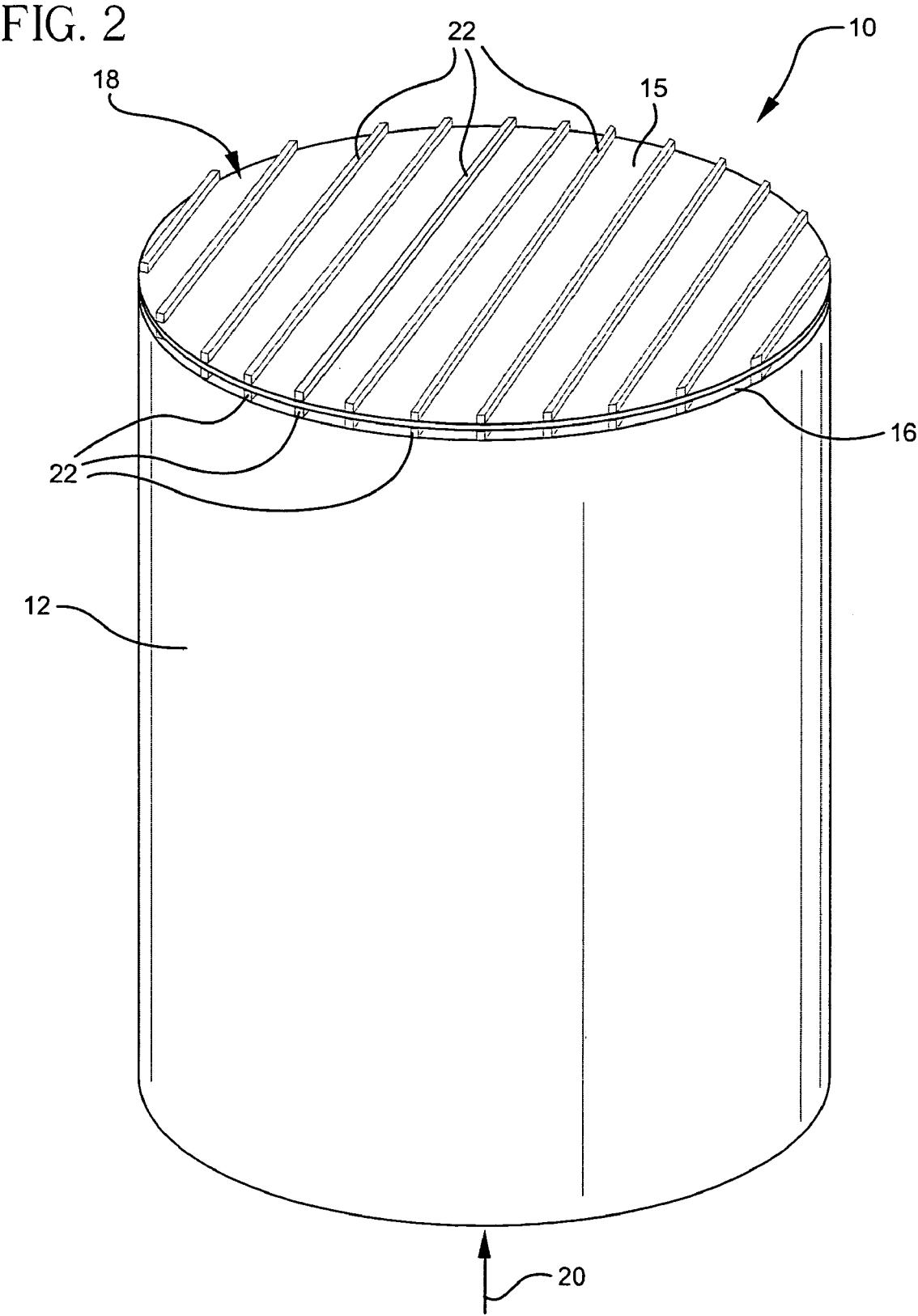
FIG. 2 is a perspective view of a lens including a pair of wire grid polarizers according to one embodiment of the invention.

An exemplary embodiment of an optical device 10 according to the present invention is shown in FIG. 1. The optical device 10 comprises a microlens 12 and a wire grid polarizer 16 on a surface of the microlens 12. As used herein, the term microlens means a lens having a diameter less than about 2 mm. For example, cylindrical, gradient index lenses having diameters 1.8 mm or 1 mm are commercially available. The microlens 12 can be a variety of shapes, but in preferred embodiments, the microlens 12 includes at least one flat surface 14. The embodiment shown in FIGS. 1 and 2 show cylindrically-shaped gradient index lenses, and light generally propagates through at least one surface of the cylindrical lens 12 in the direction indicated by the arrow 20 in FIGS. 1 and 2. Accordingly, light propagates through a surface and exits through at least one flat surface 14 of the lens. A wire grid polarizer 16 is formed on the at least one surface 14 through which light propagates. An antireflective coating 15 is then typically applied over the wire grid polarizer 16. According to certain embodiments, it may be desirable include a second wire grid polarizer 18 arranged in series with the first wire grid polarizer 16, and thus providing a pair of polarizers 16, 18 on the surface of the lens 14 as shown in FIG. 2. The second wire grid polarizer could be formed over the antireflective coating 15. A second wire grid polarizer 18 can be added in applications in which higher contrast is required. A second antireflective coating (not shown) is preferably applied over the second wire grid polarizer.

The wire grid polarizers 16, 18 preferably comprise a plurality of generally parallel reflective lines 22. The reflective lines 22 are preferably metallic lines. Preferably, the period of the lines is less than about 100 nm. In some preferred embodiments, the period of the lines is less than about 60 nm, and in other preferred embodiments, the period of the lines is less than about 45 nm.

There are several mathematical models and mathematical expressions known in the art or wire grid polarizers that can be employed to determine polarizer performance with respect to transmission of the parallel and perpendicular electric fields of incident light. The mathematical expressions utilize the variables of the period (width and spacing) of the metallic lines, the refractive index of the transparent substrate, and the light wavelength of interest. By using the mathematical expression, one can design a polarizer to give adequate polarizer performance over certain light wavebands.

In many telecommunications applications, it is desirable to obtain a polarizer with good contrast ratio and good transmission from approximately 1300–1600 nm. For a wire-grid polarizer, there are several numerical methods that can be used to calculate the theoretical performance. The classical method by J. P. Auton is given in Handbook of Optics, 1st edition, pp. 10-72–10-73. This method does not address the type of metal used or thickness of the metal lines, but assumes that the optical conductivity of the metal is infinite. Other methods that take into account the optical constants of the metal and thickness are rigorous vector diffraction theory, numerical solution to Maxwell's equations and Rigorous Coupled Wave Analysis (RCWA). These methods require extensive and numerous computations. Due to the advent of modern computers these methods are now preferred over the Auton method. For simplicity and illustrative purposed the Auton equations are used and are given below.

where:

$$B \approx \frac{d}{\lambda}\left[0.347 + \frac{Q}{4+Q} + 4 \times 10^{-3}\left(\frac{d}{\lambda}\right)^2\right] \quad A = \frac{1}{4B} \quad Q = \frac{1}{\sqrt{1-(d/\lambda)^2}} - 1$$

where:
Tp=polarization transmission coefficient parallel to the grid wires,
Ts=polarization transmission, coefficient perpendicular to the grid wires,
d=period of grid, and
λ=wavelength.

$$Tp = \frac{4nA^2}{1+(1+n)^2 A^2} \quad Ts = \frac{4nB^2}{1+(1+n)^2 B^2}$$

Figure 3:
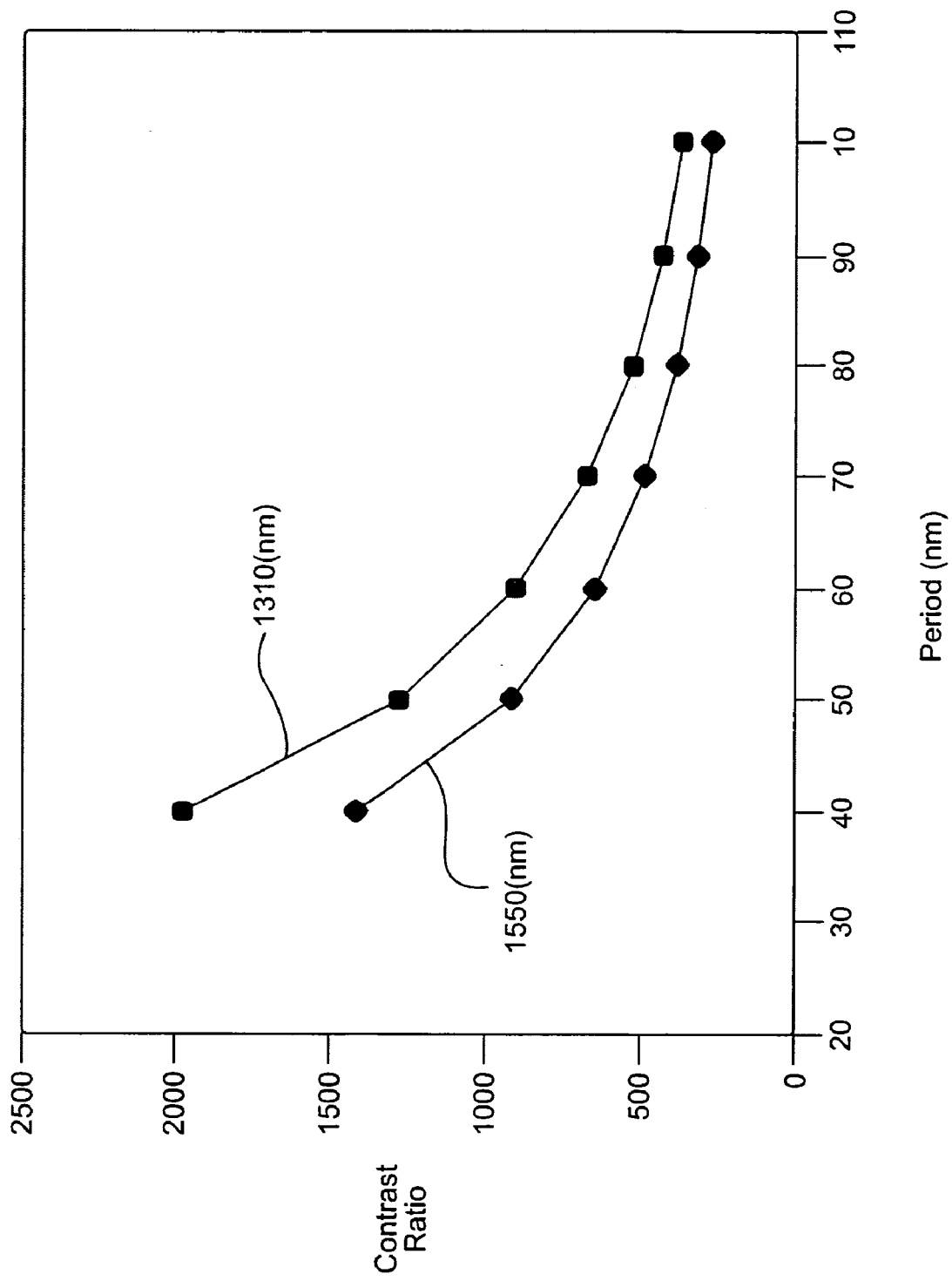
FIG. 3 is a graph showing the relationship of contrast ratio versus period for wire grid polarizers at 1310 nm and 1550 nm.

Calculations were made using the equations above to determine the period of the metallic lines necessary for such a polarizer operating in the 1300–1600 nm wavelength region. FIG. 3 is a graph showing the influence of line period on the contrast ratio of the polarizer at the wavelengths of 1310 and 1550 nm where the substrate index is 1.52. It is seen that the best contrast ratios are obtained at the shortest period of 40 nm. Contrast ratios at 1310 nm exceed 1900:1, and at 1550 nm, contrast ratios exceed 1300:1. For example, at the 1310 nm wavelength, the polarizer has a theoretical contrast ratio of 1963:1 (32.9 dB), and at the 1550 nm wavelength, the theoretical contrast ratio is 1402:1 (31.5 dB). In preferred embodiments the transmission of the polarizer at 1310 nm and 1550 nm exceeds 90%, and more preferably, exceeds 95%. For example, the transmission of a wire grid polarizer at these wavelengths will be approximately 96%. When using a microlens or microlens array, it is usually necessary to antireflection (AR) coat the lens. According to certain embodiments of the present invention, a wire grid polarizer can be formed over the AR coating on one or both sides of the microlens.

Fabricating a grating polarizer with a period smaller than 100 nm and as small as 40 nm requires the creation of metallic wires or "lines" and spacing between the lines with nanometer scale dimensions, which is extremely difficult to do using conventional photolithographic processing techniques. For a polarizer with a 40 nm period, the line width and spacing would each be 20 nm. Conventional photolithography techniques are currently limited to making features as small as approximately 200 nm. Electron beam lithography is capable of creating features in the tens of nanometers range, however, this method is quite expensive and very slow. Applicants have discovered a method of creating wire grid polarizers having nanometer scale features as small as 10 and periods as small as 40 nm. With this method, it is now feasible to produce wire grid polarizers with 20 nm line widths and 40 nm period. It is proposed herein that a techniques known as nanoimprint lithography (NIL) be employed to "print" wire grid polarizers directly on microlenses that have been AR coated. Nanoimprint lithography is described in U.S. Pat. No. 5,772,905, the contents of which are incorporated by reference.

Figure 4A:
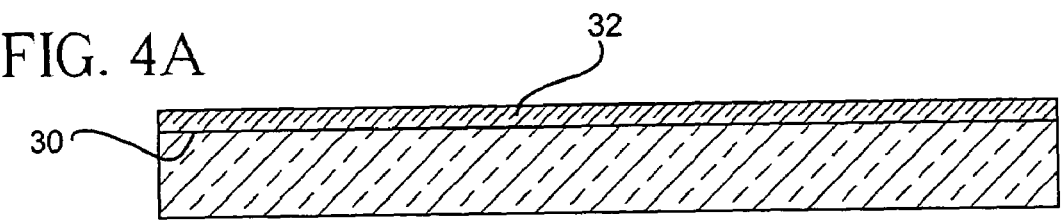
FIGS. 4A–4E illustrate a series of steps for manufacturing wire grid polarizers according to one embodiment of the invention.
Figure 4B:
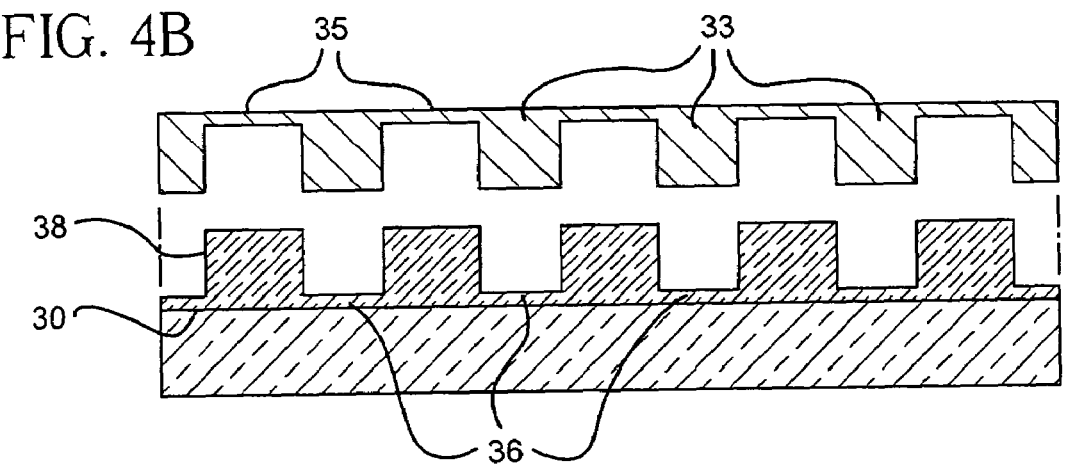
Figure 4C:
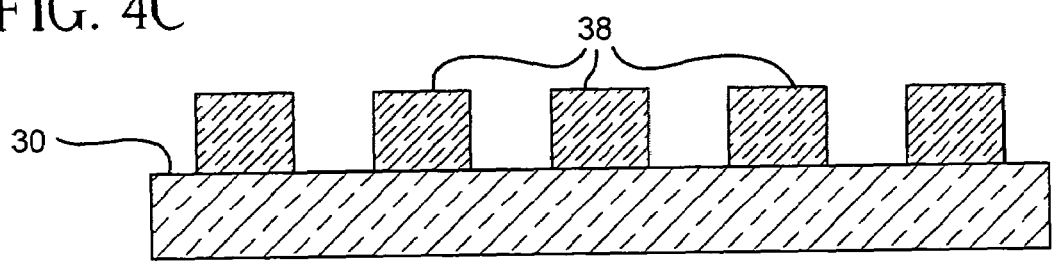
Figure 4D:
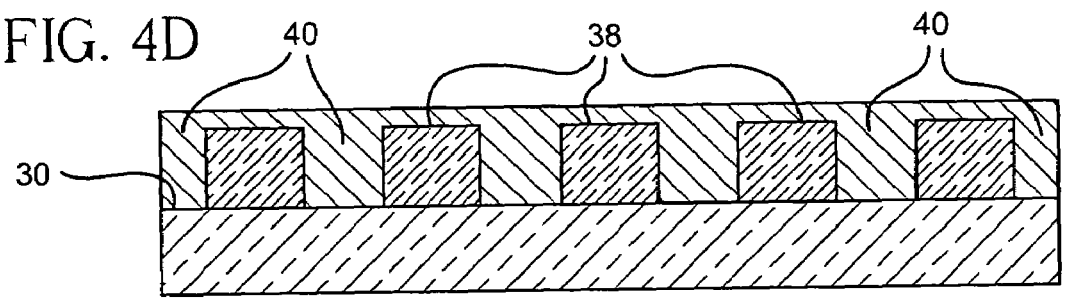

According to embodiments of the invention methods of manufacturing optical devices including a lens and a polarizer are provided. Referring now to FIGS. 4A–4E, a first method of manufacturing an optical device is shown that includes producing a microlens including a surface through which light propagates and forming a wire grid polarizer on the surface through which light propagates. Typically, the microlens will be made from glass or plastic. As shown in FIGS. 4A and 4B, a microlens including a surface 30 is provided, which is preferably a flat surface. The forming step preferably includes imprinting a wire grid polarizer, which includes forming a polymer layer 32 on the surface 30 and using an imprint tool 34 having a grid pattern with raised section 33 and thin sections 35 to imprint a grid pattern including alternating thin sections 36 and raised sections 38 on lens surface 30. The imprinting tool should be hard relative to the polymeric layer, and can be made from suitable materials such as metals, semiconductors, dielectric materials, ceramics and combinations. Suitable materials for the polymeric material include thermoplastic polymers such as polymethylmethacrylate (PMMA). The polymer can be deposited using spin coating or other suitable techniques. As shown in FIG. 4C, the method further includes removing the thin sections 36 to expose the lens surface 30. As shown in FIG. 4D, after removing the thin sections 36, metal is deposited over the structure to provide metal grid elements 40 on the lens surface 30 and between the raised sections of polymer 38. The metal can be deposited using conventional microelectronic metal deposition techniques. Suitable metals include, but are not limited to, aluminum, silver, gold, copper and chromium. After the metal has been deposited, the thick sections 38 of polymer are removed to provide a metal grid structure 42 comprised of individual metallic lines or grid elements 40 on the lens surface 30. Removal of the polymer can be accomplished using conventional microelectronic processing, such as by reactive ion etching or other appropriate methods.

Figure 4E:
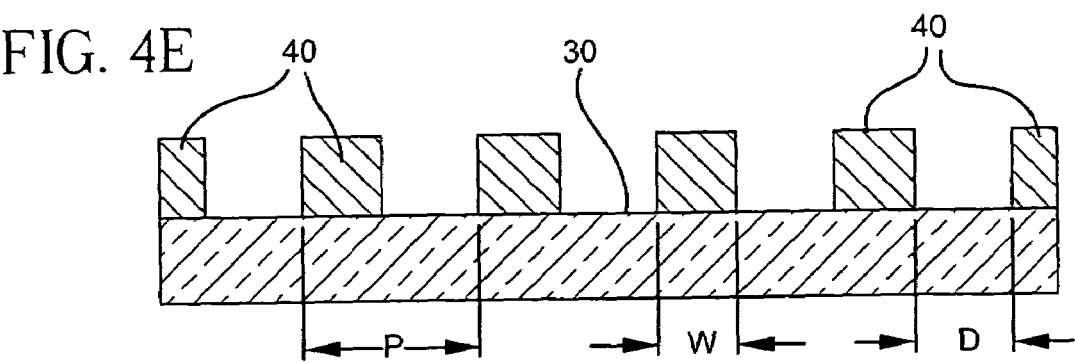

Preferably, the metal grid structure has a period less than 100 nm. As used herein the term period means the distance between each grid element, including the width of each grid element 41. As shown in FIG. 4E, this is shown as distance "P". The distance between the elements 41 is labeled as "D", and the width the element is labeled as "W".

Figure 5A:
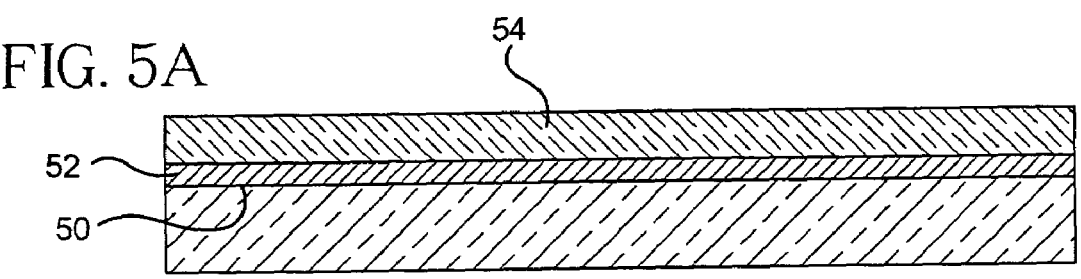
FIGS. 5A–5E illustrate a series of steps for manufacturing wire grid polarizers according to one embodiment of the invention.
Figure 5B:
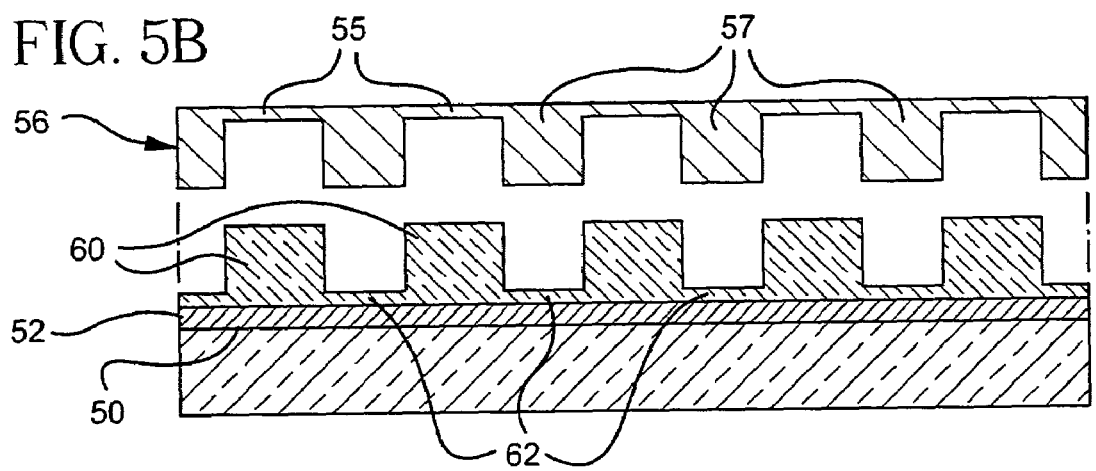
Figure 5C:
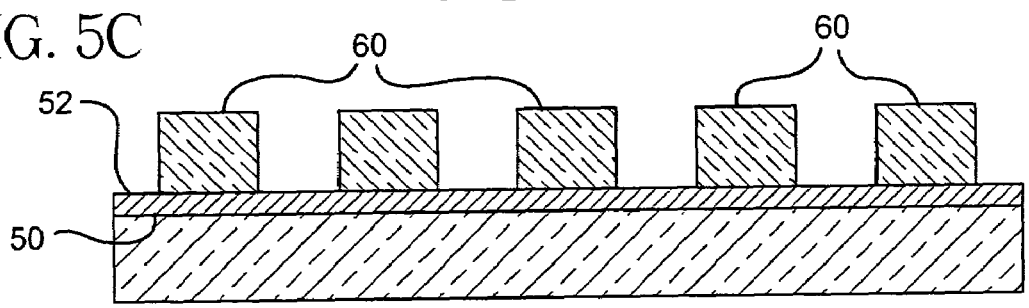
Figure 5D:
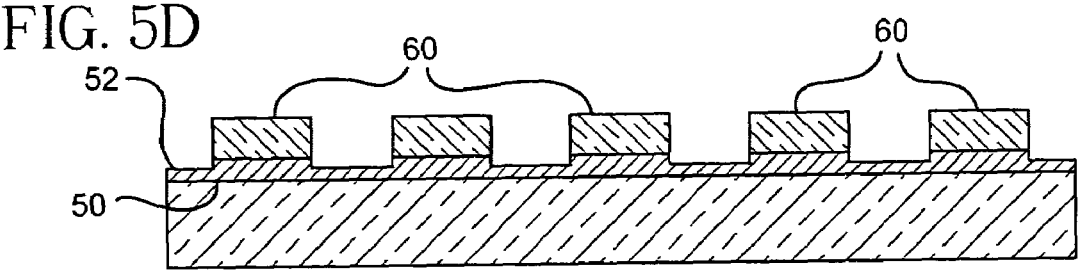
Figure 5E:
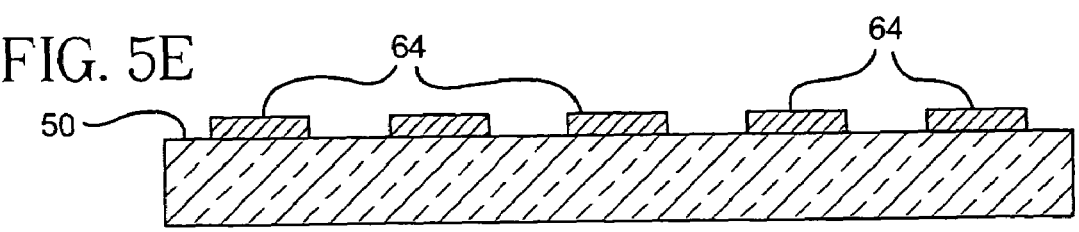

FIGS. 5A–5E show an alternative embodiment for forming a wire grid polarizer on a lens surface. In the embodiment shown in FIGS. 5A–5E, a lens having a surface 50 is provided, and a layer of metal 52 is deposited over the lens surface 50. A polymeric layer 54 is deposited over the metallic layer 50. Then, an imprinting tool 56 including a grid pattern with thin sections 55 and thick sections 57 is pressed down on the polymer layer 54 to form a polymeric grid pattern including raised sections 60 and thin sections 62. As shown in FIGS. 5C and 5D, the polymeric grid pattern is removed, preferably by etching. First, as shown in FIG. 5C, the thin sections 62 are removed to expose the metal layer 52. Next, as shown in FIGS. 5D and 5E, the thick sections 60 are removed, and at the same time, the exposed metal layer is removed, preferably by etching. FIG. 5E shows the finished product, in which the thick sections 60 have been completely removed, and portions of the metal layers that were beneath the thin sections 62 have been removed to expose the lens surface 50, providing a grid pattern comprised a series of metallic grid elements 64 on the surface 30 of the lens.

The manufacturing process described above with respect to FIGS. 4 and 5 can be implemented on a single lens, or preferably, the manufacturing process can be adapted to form wire grid polarizers on an array of lenses to facilitate mass production of lens elements with wire grid polarizers. Additional manufacturing steps may include mounting a lens or microlens array to a substrate and lapping, cleaning and polishing the lenses to achieve a flat surface to facilitate formation of the wire grid polarizer.

In one particularly useful embodiment, the process begins with a microlens (or microlens array) which is imprinted with a metallic wire grid polarizing layer. In this embodiment, the microlenses are joined or bonded to a suitable substrate. The lenses (or arrays of lenses) are bonded to the substrate such that the surface to be printed with the polarizing layer is opposite the side contacted to the substrate. After bonding the lenses to the substrate, the top surface of the lenses (to which the polarizing layer is to be applied) is cleaned and polished. A suitable polishing process is a single-sided cerium oxide slurry process followed by solvent and DI water baths. The mounted lenses (or lens arrays) are then imprinted using the nanoimprint lithography process described above with respect to FIGS. 4A–E and 5A–E. Finally, the individual microlenses (or microlens arrays) are released from the substrate using suitable solvents such as acetone, before cleaning.

In another embodiment, the microlenses to be used are spherical micro lens (or lens arrays) or SMILE™ lenses. In this embodiment, the lenses are made from a photolithographically treatable glass (commercial name Fotoform™, Corning glass code 8603). The lenses are manufactured by exposing the areas surrounding the lenses to UV light through an appropriately designed photomask. After heat treatment, these areas become glass-ceramic in nature as a result of lithium meta-silicate crystal growth. The array is then placed in a molten sodium salt bath. Ion exchange at the lens surface causes (but not in significant quantities in the surrounding lithium meta-silicate areas) causes the lens surface to expand in a convex manner. The lens diameter and the duration of time spent in the salt bath determine the amount of convexity (and hence focal length).

After grinding and polishing one side of the lens array using conventional single-side lapping and polishing, for example, using cerium oxide slurry, the microlens arrays are cleaned and mounted on a substrate before being nano-lithographically imprinted with a wire grid polarizer, de-mounted and cleaned.

In another embodiment, the microlenses (or arrays) to be used are made of glass that has been re-pressed using a precision molding technique. In this embodiment, the glass of choice is cut to a block appropriate weight for the final part, heated to the appropriate softening point of the glass, and then pressed into the desired lens form using a male and female tool of the appropriate shape. Once cooled, the lenses can then have the polarizing layer applied as described in the embodiments above.

By combining nanoimprint technology over a large area substrate made up of a large array of microlenses together, a microlens preform can be manufactured. The combined laminated structure (array of microlenses with nanoimprinted wire grid polarizers) can then be diced or released into individual microlenses of small cross sectional area.

Direct formation by imprinting of wire grid polarizers onto a microlens has several advantages. Because the wire grid polarizers are directly applied to the lens, a monolithic structure is created and as a result the device would be durable and stable in performance when subjected to environmental extremes. Additionally, the smaller overall thickness of the monolithic wire grid/lens will shorten the optical path and reduce the number of potentially reflecting surfaces in any device that utilizes the lens and polarizer combination.

It will be apparent to those skilled in the art that various modifications and variations can be made to the present invention without departing from the spirit or scope of the invention. For example, while particular embodiments have been described with respect to imprinting techniques for forming wire grid polarizers on a lens surface, it will be understood tat other techniques could be used to form the wire grid polarizer on the surface of the lens. Thus, it is intended that the present invention cover modifications and variations of this invention provided they come within the scope of the appended claims and their equivalents.

What is claimed is:

1. An optical device comprising:
   a microlens including at least one surface through which light propagates; and
   a wire grid polarizer adapted for polarizing light in a wavelength range of 1300 nm to 1600 nm, the wire grid polarizer formed on the at least one surface through which light propagates, the wire grid polarizer comprising a plurality of generally parallel reflective lines having a period less than 100 nm.

2. The optical device of claim 1, further comprising at least a pair of wire grid polarizers stacked on the at least one surface through which light propagates.

3. The optical device of claim 1, wherein the period of the lines is less than 60 nm.

4. The optical device of claim 1, wherein the period of the lines is less than 45 nm.

5. An optical device, comprising:
   a microlens including at least one surface through which light propagates; and
   a wire grid polarizer formed on the at least one surface through which light propagates, the wire grid polarizer comprising a plurality of generally parallel reflective lines, the period of the lines being less than 45 nm;
   wherein the contrast ratio of the polarizer at a wavelength of approximately 1310 nm exceeds 1900.

6. The optical device of claim 5, wherein the transmission of the polarizer exceeds 95%.

7. An optical device, comprising:
   a microlens including at least one surface through which light propagates; and
   a wire grid polarizer formed on the at least one surface through which light propagates, the wire grid polarizer comprising a plurality of generally parallel reflective lines, the period of the lines being less than 45 nm;
   wherein the contrast ratio of the polarizer at a wavelength of approximately 1550 nm is greater than about 1300.

8. The optical device of claim 7, wherein the transmission of the polarizer exceeds about 95%.

9. A method of making an optical device comprising:
  producing a microlens including a surface through which light propagates; and
  forming a wire grid polarizer adapted for polarizing light in a wavelength range of 1300 nm to 1600 nm on the surface through which light propagates, the wire grid polarizer comprising a plurality of generally parallel reflective lines having a period less than about 100 nm.

10. The method of claim 9, wherein the period of the lines is less than 50 microns.

* * * * *